(12) United States Patent
Becker et al.

(10) Patent No.: US 6,267,459 B1
(45) Date of Patent: Jul. 31, 2001

(54) AUTOMATIC BELT ALIGNMENT SYSTEM FOR AN ENDLESS TRACK LAYING WORK MACHINE

(75) Inventors: Dan J. Becker; Daniel M. Keehner, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/460,029

(22) Filed: Dec. 13, 1999

(51) Int. Cl.[7] ............................ B62D 55/30; B62D 55/14; B62D 25/16
(52) U.S. Cl. ..................... 305/193; 305/116; 305/125; 305/143; 305/155
(58) Field of Search ..................... 305/116, 125, 305/143, 153, 155, 193, 195, 136, 138

(56) References Cited

U.S. PATENT DOCUMENTS

| 140,418 | 7/1873 | Hutton . |
| 1,022,949 | 4/1912 | Johnson . |
| 3,789,552 | 2/1974 | Bradbury et al. . |
| 4,227,748 | * 10/1980 | Meisel, Jr. ............................ 305/153 |
| 4,405,026 | 9/1983 | Merrifield . |
| 5,127,714 | 7/1992 | Satzler . |
| 5,293,948 | * 3/1994 | Crabb .................................. 305/138 |
| 5,312,176 | 5/1994 | Crabb . |
| 6,024,183 | * 2/2000 | Dietz et al. .......................... 305/153 |

FOREIGN PATENT DOCUMENTS

93/13747 * 8/1992 (EP) .................................... 305/116

* cited by examiner

Primary Examiner—S. Joseph Morano
Assistant Examiner—Jason R. Bellinger
(74) Attorney, Agent, or Firm—Jeff A. Greene

(57) ABSTRACT

Endless track laying work machines are provided with a pair of track roller assemblies positioned on opposite sides of the work machine. Each track roller assembly includes an endless rubber belt entrained around a drive wheel, an idler wheel, and a plurality of supporting mid-rollers. An automatic belt alignment system is utilized to align the endless rubber belt during operation of the endless track laying work machine (10). The automatic belt alignment system also provides connection of the idler wheel assembly to a tensioning system and to the forwardly extending nose portion of a track roller frame.

20 Claims, 4 Drawing Sheets

Fig_3

AUTOMATIC BELT ALIGNMENT SYSTEM FOR AN ENDLESS TRACK LAYING WORK MACHINE

TECHNICAL FIELD

This invention relates generally to an arrangement for aligning the track of an endless track laying work machine and, more particularly, to an arrangement for automatically aligning the track during operation.

BACKGROUND ART

Some present day endless track laying work machines utilize an endless rubber belt as the means for propelling. The endless rubber belt is tensioned into frictional engagement with and entrained about a drive wheel and an idler wheel. Problems encountered in reducing such an endless track laying work machine to practice include how to maintain adequate tension on such belt and laterally aligning the belt to run true with the drive and idler wheels. Keeping the belt in alignment with the wheels is especially critical when the belt is subject to lateral loads. Other problems are maintaining the structural integrity and providing long life of the belt, and other drive train components.

Examples of prior belt alignment mechanisms are shown in U.S. Pat. Nos. 5,127,714 and 5,312,176. In both examples the alignment is adjusted by moving an arm that is pivotally attached to the idler wheel. Movement of the arm is accomplished through a jack screw arrangement with a jam nut used to lock the arm in place. Both patents provide a manual means for adjusting the alignment of the idler wheel to keep the belt in proper alignment and entrained around the drive and idler wheels. However, neither patent addresses the different lateral loads that are encountered as the endless track laying machine maneuvers turns and side slopes.

The present invention is directed to overcoming one or more of the problems as set forth above.

DISCLOSURE OF THE INVENTION

In one aspect of the present invention an automatic belt aligning system is provided for a track roller assembly that includes an endless rubber belt that is entrained around a drive wheel and an idler wheel assembly. The drive wheel and the idler wheel assembly are attached at opposite ends of a roller frame. The automatic belt alignment system includes a spindle that has first and second spaced apart shaft portions and first and second radially extending flange portions. A first aligning mechanism is pivotally connected to the first radially extending flange portion of the spindle. A second aligning mechanism is pivotally connected to the second radially extending flange portion of the spindle. A lever member is connected to the second aligning mechanism and is positioned in operative communication with the endless rubber belt.

BEST MODE FOR CARRYING OUT THE INVENTION

Figure 1:
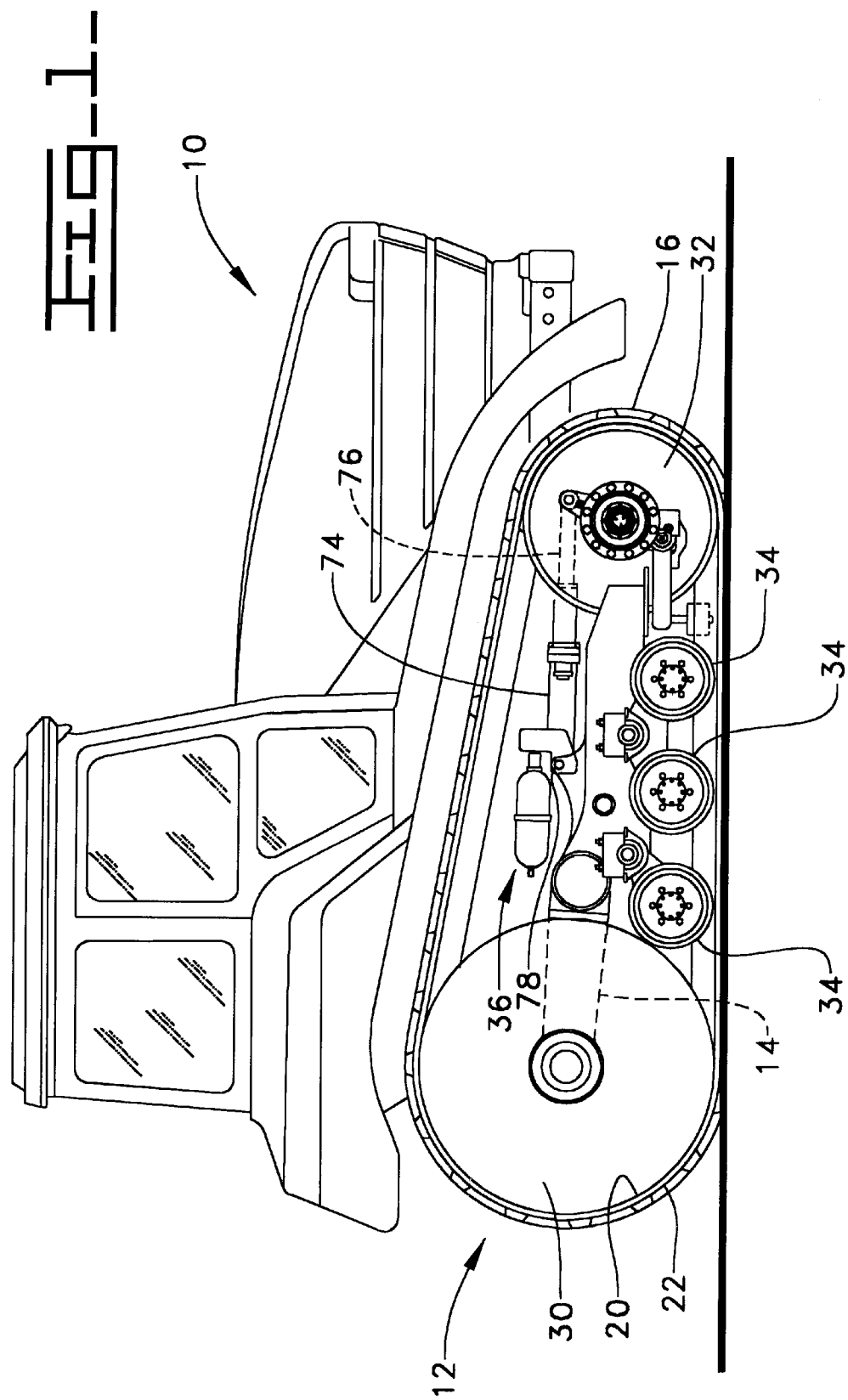
FIG. 1 is a side elevational view of a work machine embodying the present invention.
Figure 2:
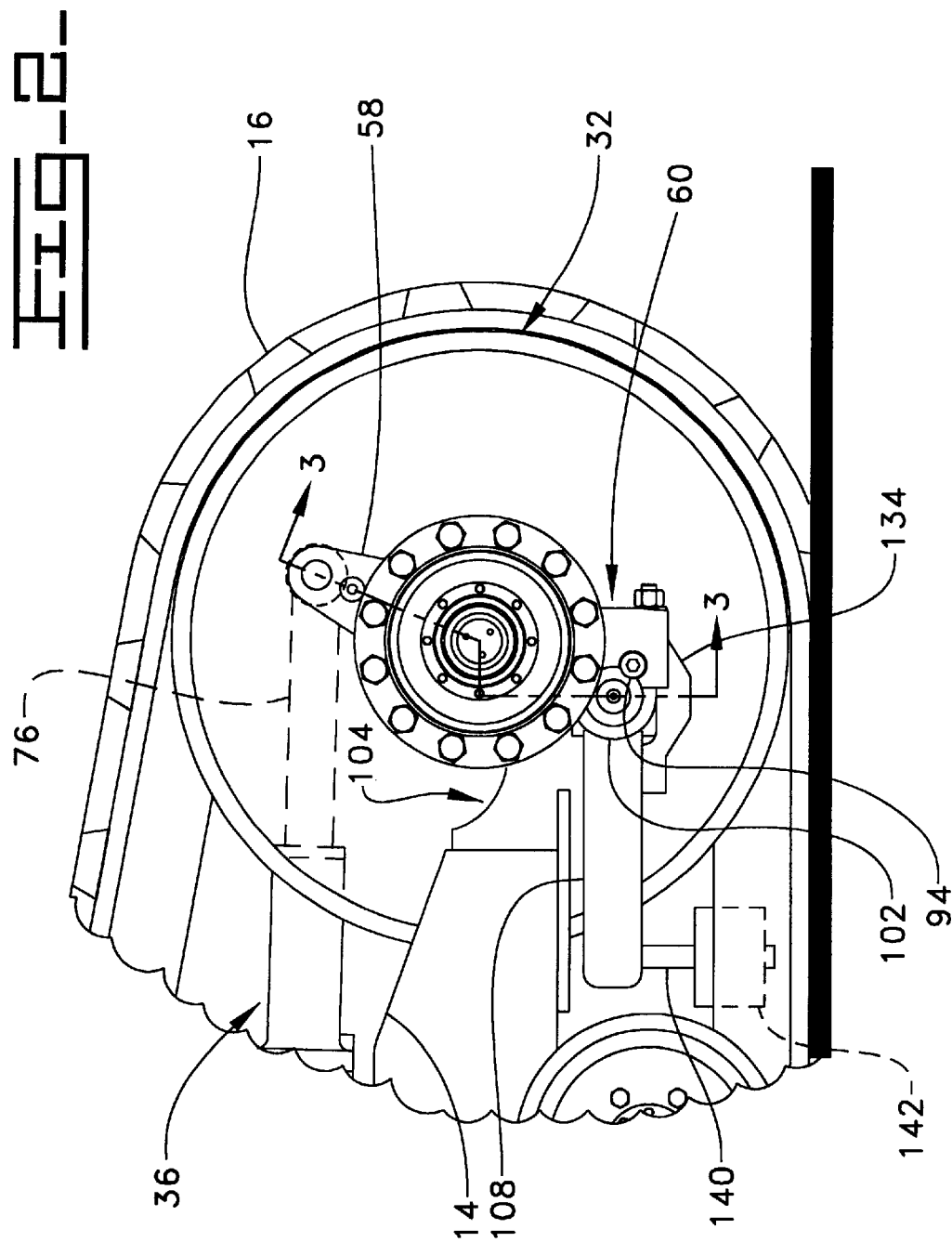
FIG. 2 is an enlarged diagrammatic side view of the idler wheel from FIG. 1.
Figure 3:
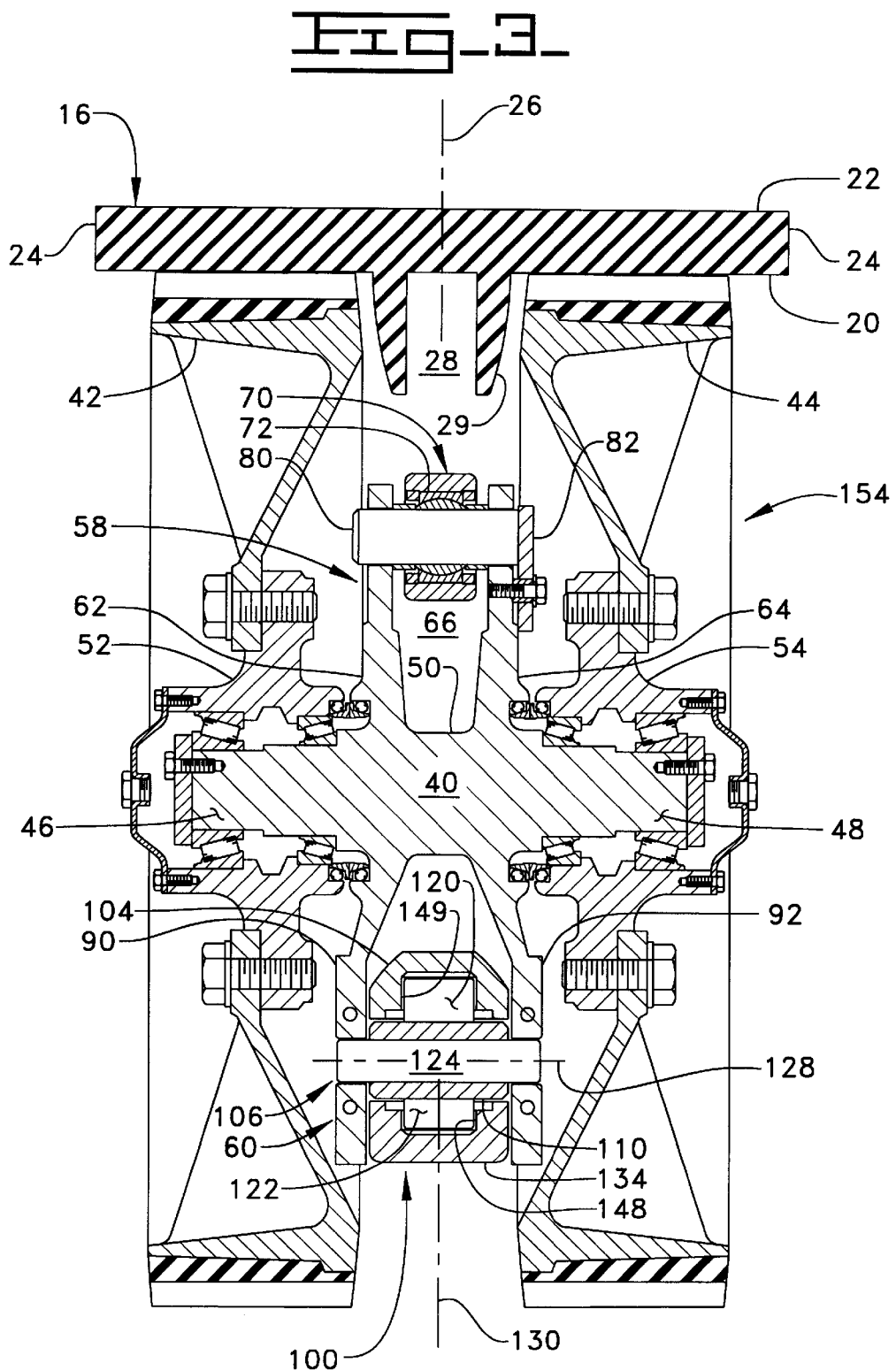
FIG. 3 is a diagrammatic cross-sectional view taken generally along the lines 3—3 of FIG. 2

Referring to FIGS. 1–3 a track laying work machine 10 is shown having a pair of track roller assemblies 12, only one shown, one positioned on each side of the track laying work machine 10. In as much as the track roller assemblies 12 are substantially structurally and operatively similar, further reference will be made to only a single side of the track laying work machine 10. Each track roller assembly 12 includes a roller frame 14 and utilizes a track, which in this example is an endless rubber belt 16. The endless rubber belt 16 defines an inner surface 20, a ground contacting or outer surface 22, and a pair of edges 24, as seen in FIG. 3. The pair of edges 24 of the endless rubber belt 16 defines an elevational axis 26 centrally positioned therebetween. Additionally positioned between the pair of edges 24 and located on the inner surface 20 of the endless rubber belt 16 is a groove 28 or a protrusion 29. The endless rubber belt 16 is entrained around a drive wheel 30, an idler wheel assembly 32 and a plurality of supporting mid-rollers 34.

In this example, an engine (not shown) powers the drive wheel 30, in a conventional manner. The drive wheels 30 in turn frictionally drive the endless rubber belt 16. A tensioning system 36 is used to urge the idler wheel assembly 32 away from the drive wheel 30 and tension the endless rubber belt 16 into frictional engagement therewith. The track laying work machine 10 is shown for example to be an agricultural tractor. However, the track laying work machine 10 could be a combine harvester, skid steer loader or any other track laying work machine.

The idler wheel assembly 32 has a spindle 40 and first and second spaced wheel segments 42,44 rotatably supported on the spindle 40. The spindle 40 includes first and second spaced apart shaft portions 46,48, and a middle portion 50. First and second hubs 52,54 are rotatably connected to the first and the second shaft portions 46,48 respectively. The wheel segments 42,44 are connected to the respective first and second hubs 52,54, as for example by fasteners. The spindle 40 also has first and second radially extending flange portions 58,60, with the first flange portion 58 having first and second spaced flanges 62,64 which define a space 66 therebetween.

A first aligning mechanism 70, including a spherical bearing assembly 72, is positioned between the first and second spaced flanges 62,64 and within the space 66. As best seen in FIGS. 1 and 2, the track tensioning mechanism 36 includes a hydraulic ram assembly 74 having a first end portion 76 pivotally connected to the respective first flange portion 58. A second end portion 78 of the ram assembly 74 is connected to the roller frame 14. The first aligning mechanism 70 serves to connect the first end portion 76 of the track tensioning mechanism 36 to the first radially extending flange portion 58 of the spindle 40 by way of a retaining pin 80. The retaining pin 80 has a radially extending portion 82, which is connected to the first flange portion 58.

The second flange portion 60 include third and fourth spaced flanges 90, 92. As shown in FIG. 2, the third and fourth spaced flanges 90, 92 have a "C" configuration and define semi-cylindrical receiving portions 94. FIG. 3 shows a second aligning mechanism 100 positioned between and connected to the third and fourth flanges 90, 92 by "U" bolts 102 as shown in FIG. 2. The second aligning mechanism 100 also serves to connect the idler wheel assembly 32 to a forwardly extending nose portion 104 of the track roller frame 14.

Referring to FIGS. 2 and 3 in combination with 4 and 5, the second aligning mechanism 100 includes a universal type apparatus 106 and a lever member 108. The universal type apparatus 106 has a block portion 110 having first and second connecting portions 112, 114. The first connecting portion 112 includes first and second connecting pins 120, 122 and the second connecting portion 114 includes a roller pin assembly 124. The roller pin assembly 124 is positioned in a bore 126 and is retained therein as by a press fit. The bore 126 defines an axis 128 in the block portion 110 at an angle substantially normal to an axis 130 defined by the first and second pins 120, 122. The semi-cylindrical receiving portions 94 of the third and fourth spaced flanges 90, 92 are adapted to receive the roller pin assembly 124 and pivotally connect the idler wheel assembly 32 to the universal type apparatus 106.

A cap member 134 secures the block portion 110 of the universal type apparatus 106 to the forwardly extending nose portion 104 of the track roller frame 14. The cap member 134 has a mounting portion 136 and a pin-receiving portion 138. The pin-receiving portion 138 is adapted to receive the second connecting pin 122 of the second aligning mechanism 100.

Figure 4:
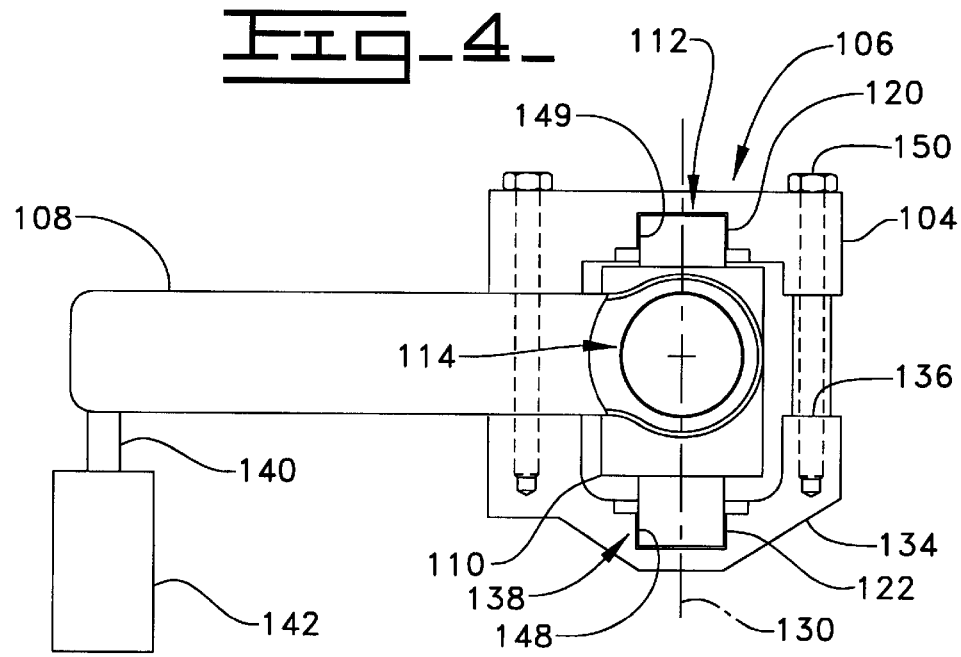
FIG. 4 is a diagrammatic side elevational, partly is section, of an automatic aligning mechanism of the present invention.

As shown in FIG. 4, the lever member 108 has an arm portion 140 connected at one end thereof and the block portion 110 is positioned at the opposite end. The lever member 108 extends away from the block portion 110 a predetermined distance and the arm portion 140 forms an angle, substantially normal to the lever member 108, and extends towards the endless rubber belt 16. A roller element 142 is rotatably connected to the arm portion 140 and is positioned in the groove 28 in operative communication with the endless rubber belt 16.

Figure 5:
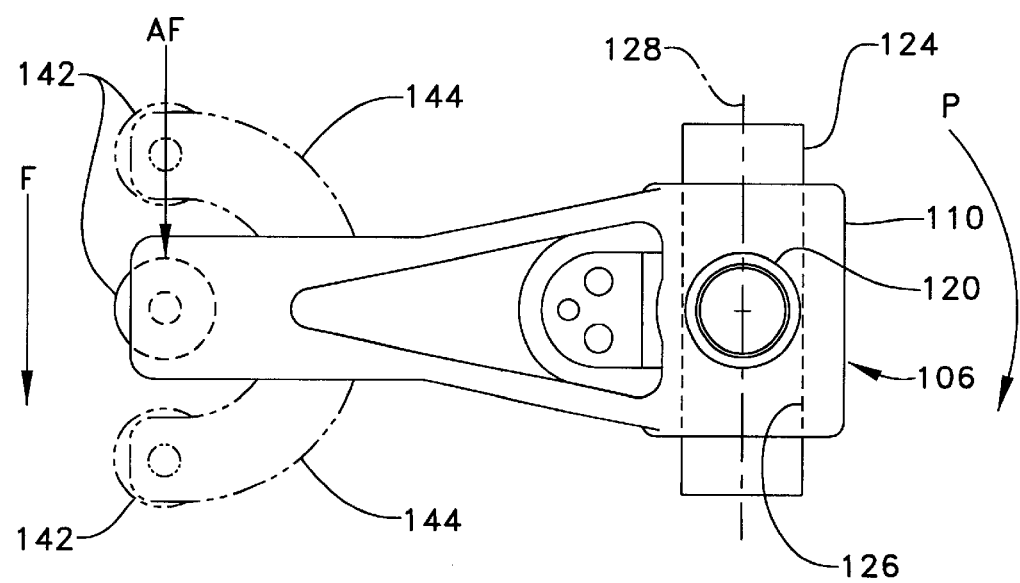
FIG. 5 is a diagrammatic cross-sectional view taken along lines 5—5 of FIG. 4.

As an alternative, shown in phantom in FIG. 5 the lever member 108 has a pair of spaced apart arm portions 144 connected at one end thereof and the block portion 110 is positioned at the opposite end. A roller element 142 is rotatably connected to each arm portion 144 and one each is positioned on each side of the protrusion 29 in operative communication with the endless rubber belt 16.

The forwardly extending nose portion 114 pivotally connects the idler wheel assembly 30 to the roller frame 14. A bore 149 in the forwardly extending nose portion 104 of the track roller frame 14 receives the first connecting pin 120 of the second aligning mechanism 100. A bore 148 in the pin-receiving portion 138 of the cap member 134 is inserted over the second connecting pin 122. The cap member 134 is secured to the forwardly extending nose portion 104 by a plurality of threaded fasteners 150.

The first aligning mechanism 70, the second aligning mechanism 100, and the lever member 108 define an automatic belt alignment system 154. The automatic belt alignment system 154 aligns the endless rubber belt 16 during operation of the endless track laying work machine 10. Additionally, the automatic belt alignment system 154 provides connection of the idler wheel assembly 32 to the tensioning system 36 and to the forwardly extending nose portion 104 of the track roller frame 14.

While the invention is susceptible to various modifications and alternative forms, the automatic alignment system 154 has been shown by way of example in the drawings and has been described in detail herein. It should be understood, however, that there is no intent to limit the invention to the particular form disclosed, but on the contrary, the intention is to cover all modifications, equivalents, and alternatives falling within the spirit and scope of the invention as defined by the appended claims.

Industrial Applicability

With reference to the drawings, the subject invention is particularly useful on work vehicles, which are supported and are propelled on track roller assemblies 14 that utilize endless rubber belts 16.

In operation the track laying work machine 10 traverses different terrain and performs maneuvers subjecting the endless rubber belt 16 of each track roller assembly 12 to different forces. For example, when the track laying work machine 10 travels along side slopes, the weight of the track laying work machine 10 pulls against the endless rubber belt 16, and causes the endless rubber belt 16 to be pulled in a direction down hill of the slope being traversed. The pulling force deforms or bows the endless rubber belt 16 in the direction indicated by the arrow labeled "F" in FIG. 5. When the track laying work machine 10 is maneuvering a turn, a similar force is exerted causing the endless rubber belt 16 to deform in the direction of "F" outward and away from the direction of the turn. Both of these examples pull on the endless rubber belt 16 and tend to pivot or rotate the idler wheel assembly 32, in the direction indicated by the arcuate arrow labeled "P", about the axis 130 defined by the first and second connecting pins 120, 122.

The deformation of the endless rubber belt 16 causes the sidewall of the groove 28 or the protrusion 29 to contact the roller element 142. The contact causes the endless rubber belt 16 to apply a force, indicated by the arrow labeled "AF", against the roller element 142. The force acts on the lever member 108 rotating the block portion 110 of the second aligning mechanism 100 about the axis 130 in a direction opposite of the direction indicated by force "AF". The harder the endless rubber belt 16 pushes against roller element 142, due to the inclination of a side slope or abruptness of a turn, the more the lever member 108 opposes the tendency for the idler wheel assembly 32 to pivot.

Thus, the automatic belt aligning mechanism 154 automatically maintains alignment and opposes the tendency of "throwing" a belt during operation of the track laying work machine 10. The automatic aligning mechanism 154 utilizes first and second aligning mechanisms 70, 100 and a lever member 108 for connecting the idler wheel assembly 32 to the roller frame 14. With the roller element 142 positioned at the end of the arm portion 140 of the lever member 108 and in communication with the groove 28 or protrusion 29 undue wear of the endless rubber belt 16 is also reduced.

Other aspects, objects, and features of the present invention can be obtained from a study of the drawings, the disclosure, and the appended claims.

What is claimed is:

1. An automatic belt aligning system for a track roller assembly including an endless rubber belt being entrained around a drive wheel and an idler wheel assembly, the drive wheel and the idler wheel assembly being attached at opposite ends of a roller frame, said belt alignment system comprising;

a spindle having first and second spaced apart shaft portions and first and second radially extending flange portions;

a first aligning mechanism being pivotally connected to the first radially extending flange portion;

a second aligning mechanism being pivotally connected to the second radially extending flange portion; and a lever member being connected to said second aligning mechanism and positioned in operative communication with the endless rubber belt.

2. The automatic belt aligning system, as set forth in claim 1, wherein said lever member further including an arm portion being positioned in a groove in the endless rubber belt.

3. The automatic belt aligning system, as set for the in claim 2, wherein said arm portion further includes a roller element rotatably connected thereto.

4. The automatic belt aligning system, as set forth in claim 1, wherein said lever member further including a pair of arm portions one each of the pair being positioned on opposite sides of a protrusion on an inner surface of the endless rubber belt.

5. The automatic belt aligning system, as set for the in claim 4, wherein said pair of arm portions further include a roller element rotatably connected to each arm portion.

6. The automatic belt aligning system, as set forth in claim 1, wherein said first aligning mechanism includes a spherical bearing assembly.

7. The automatic belt aligning system, as set forth in claim 1, wherein said second aligning mechanism includes a universal type apparatus having a block portion having first and second connecting pins and a roller pin assembly, said roller pin assembly being positioned at an angle substantially normal to said first and second connecting pins, said roller pin assembly pivotally connecting said block portion to said second flange portion.

8. The automatic belt aligning system, as set forth in claim 7, wherein the first connecting pin of the universal type apparatus being received by a forwardly extending nose portion of the roller frame and the second connecting pin being received in a pin receiving portion of a cap member, said cap member having a mounting portion being adapted to be connected to said forwardly extending nose portion of the roller frame.

9. The automatic belt aligning system, as set forth in claim 1, further including a tensioning system being connected to said spherical bearing assembly of said first aligning mechanism.

10. The automatic belt aligning system, as set forth in claim 1, further including first and second wheel segments respectively rotatably connected to the first and second spaced apart shaft portions.

11. The automatic belt aligning system, as set forth in claim 1, in combination with an endless track laying work machine having a pair of track roller assemblies.

12. A track roller assembly comprising:
   a roller frame;
   a drive wheel being attached to said roller frame;
   an idler wheel assembly being pivotally connected to said roller frame;
   an endless rubber belt entrained about said drive wheel and said idler wheel assembly;
   a tensioning system being connected to said roller frame and said idler wheel assembly; and
   an automatic belt aligning system pivotally connecting said idler wheel assembly to said roller frame and being positioned in operative communication with said endless rubber belt.

13. The track roller assembly of claim 12, wherein said automatic alignment system, further including (i) a first aligning mechanism being connected between said tensioning system and said idler wheel assembly, (ii) a second aligning mechanism positioned between said idler wheel assembly and said roller frame, and (iii) a lever member being connected to said second aligning mechanism and positioned in a groove in said endless rubber belt.

14. The track roller assembly of claim 13, wherein said first aligning mechanism includes a spherical bearing assembly.

15. The track roller assembly of claim 13, wherein said tensioning system is connected to said spherical bearing assembly by a retaining pin.

16. The track roller assembly of claim 13, wherein said second aligning mechanism includes a universal type apparatus having a block portion having first and second connecting pins and a roller pin assembly, said roller pin assembly being positioned at an angle which is substantially normal to said first and second connecting pins, said roller pin assembly pivotally connecting said block portion to said second flange portion.

17. The track roller assembly of claim 16, further includes a cap member having a mounting portion and a pin receiving portion, said mounting portion adapted to be connected to said roller frame and said pin receiving portion adapted to receive said second connecting pin.

18. The track roller assembly of claim 17, wherein said roller frame includes a forwardly extending nose portion which is adapted to receive said first connecting pin, said cap member being connected to said forwardly extending nose portion by a plurality of fasteners.

19. The track roller assembly of claim 12, including a plurality of supporting mid-rollers positioned between said drive wheel and said idler wheel assembly and being connected to said roller frame.

20. The track roller assembly, as set forth in claim 12, in combination with an endless track laying work machine.

* * * * *